United States Patent
Deng et al.

(10) Patent No.: US 9,990,757 B2
(45) Date of Patent: *Jun. 5, 2018

(54) ENHANCING VIDEO CHATTING

(71) Applicant: ArcSoft Inc., Fremont, CA (US)

(72) Inventors: Hui Deng, San Ramon, CA (US); Jin Wang, Hangzhou (CN); Kaixuan Mao, Fremont, CA (US)

(73) Assignee: ArcSoft, Inc., Fremont, CA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/710,611

(22) Filed: Sep. 20, 2017

(65) Prior Publication Data

US 2018/0012390 A1  Jan. 11, 2018

Related U.S. Application Data

(63) Continuation of application No. 14/304,831, filed on Jun. 13, 2014, now Pat. No. 9,792,716.

(51) Int. Cl.
*H04N 7/14* (2006.01)
*G06T 13/80* (2011.01)
*G06K 9/00* (2006.01)
*H04N 5/232* (2006.01)

(52) U.S. Cl.
CPC .......... *G06T 13/80* (2013.01); *G06K 9/00315* (2013.01); *H04N 5/23219* (2013.01); *H04N 5/23229* (2013.01); *H04N 7/147* (2013.01); *H04N 2007/145* (2013.01)

(58) Field of Classification Search
USPC ....... 348/14.07, 14.08, 14.09, 14.01, 211.12, 348/471, 575, 333.03
See application file for complete search history.

(56) References Cited

U.S. PATENT DOCUMENTS

| | | | |
|---|---|---|---|
| 5,764,306 A * | 6/1998 | Steffano | G11B 27/034 348/552 |
| 5,990,931 A | 11/1999 | Nimri et al. | |
| 7,218,339 B2 * | 5/2007 | Jacobs | H04N 13/0431 348/42 |
| 2001/0033675 A1 * | 10/2001 | Maurer | G06K 9/00228 382/103 |
| 2008/0235724 A1 * | 9/2008 | Sassenscheidt | G06F 17/30793 725/32 |
| 2011/0164105 A1 * | 7/2011 | Lee | H04N 7/142 348/14.02 |

* cited by examiner

*Primary Examiner* — Yosef K Laekemariam
(74) *Attorney, Agent, or Firm* — Patent Law Group LLP; David Hsia

(57) ABSTRACT

A method for a computing device to enhance video chatting Includes receiving a live video stream, processing a frame in the live video stream in real-time, and transmitting the frame to another computing device. Processing the frame in real-time includes detecting a face, an upper torso, or a gesture in the frame, and applying a visual effect to the frame. The method includes processing a next frame in the live video stream in real-time by repeating the enhancing, the detecting, and the applying.

16 Claims, 11 Drawing Sheets

ENHANCING VIDEO CHATTING

CROSS-REFERENCE TO RELATED APPLICATIONS

This application is a continuation of U.S. patent application Ser. No. 14/304,831, filed Jun. 13, 2014, titled "Enhancing Video Chatting", assigned to the present assignee and incorporated herein by reference.

BACKGROUND

Video chatting applications can be found on many types of computing devices such as mobile phones, tablets, and laptops. A user concerned about his or her appearance or the appearance of his or her background may not wish to video chat. A user wishing to remain anonymous may also not wish to video chat.

BRIEF DESCRIPTION OF THE DRAWINGS

In the drawings.

Use of the same reference numbers in different figures indicates similar or identical elements.

DETAILED DESCRIPTION

As used herein, the term "includes" means includes but not limited to, the term "including" means including but not limited to. The terms "a" and "an" are intended to denote at least one of a particular element. The term "based on" means based at least in part on. The term "or" is used to refer to a nonexclusive such that "A or B" includes "A but not B," "B but not A," and "A and B" unless otherwise indicated.

In examples of the present disclosure, a video chatting application alone or with a plug-in enhances a video chat by applying real-time visual effects to a live video stream. The video chatting application may improve the appearance of a user in the live video stream to encourage the use of video chatting. The video chatting application may enrich the live video stream with static or dynamic visual elements to make video chatting more fun. The video chatting application may obscure the identity of the user or the background to improve privacy.

Figure 1:
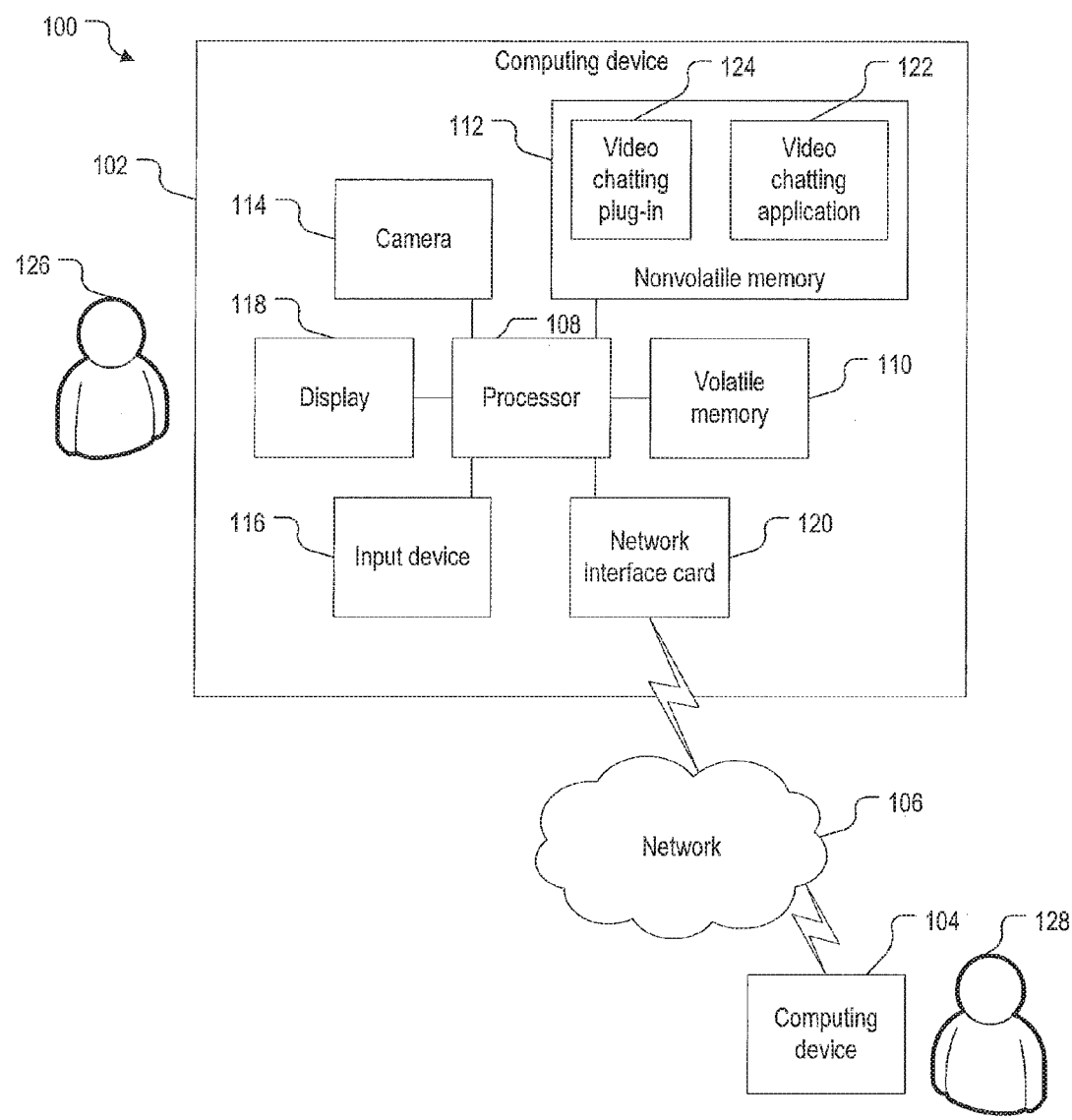
FIG. 1 is a block diagram of a video chat system with a computing device that communicates with another computing device over a network in examples of the present disclosure.

FIG. 1 is a block diagram of a video chatting system 100 with a computing device 102 that communicates with a computing device 104 over a network 106 in examples of the present disclosure. Computer devices 102 and 106 may each be a mobile phone, a table computer, a laptop computer, a desktop computer, a smart television, a set-top box. Network 106 may be a private or public, wired or wireless network.

Computing device 102 includes a processor 108, a volatile memory 110, a nonvolatile memory 112, a camera 114, an input device 116, a display 118, and a wired or wireless network interface card (NIC) 120. Nonvolatile memory 112 stores a video chatting application 122 and a plug-in 124 that adds features to video chatting application 122. Alternatively video chatting application 122 includes the features of plug-in 124. Processor 108 loads the code of video chatting application 122 and plug-in 124 from nonvolatile memory 112 to volatile memory 110, executes the code, and stores application data in volatile memory 110. Input device 116 may be a mouse, a touchpad, a touchscreen, or a keyboard.

A user 126 at computing device 102 runs video chatting application 122 to video chat with a user 128 at computing device 104. Executing video chatting application 122, processor 108 transmits a local live video stream captured by camera 114 to computing device 104. Processor 108 shows a remote live video stream received from computing device 104 on display 118. Processor 108 may also show the local live video stream on display 118 where the remote live video stream appears in a larger window and the local live video stream appears in a smaller window superimposed over the larger window.

Plug-in 124 enriches a video chat by enhancing the local live video stream in real-time. Executing plug-in 124, processor 108 detects a face, facial features, an upper torso, and a gesture, if any, from the local live video stream in real-time. Based on the detected face, facial features, upper torso, and gesture, if any, processor 108 applies visual effects to the local live video stream in real-time. The visual effects may include retouching the face, applying cosmetics to the face, adding static or dynamic visual elements to or about the face, obscuring the face, a facial feature, or a background, and removing or replacing the background.

Figure 2:
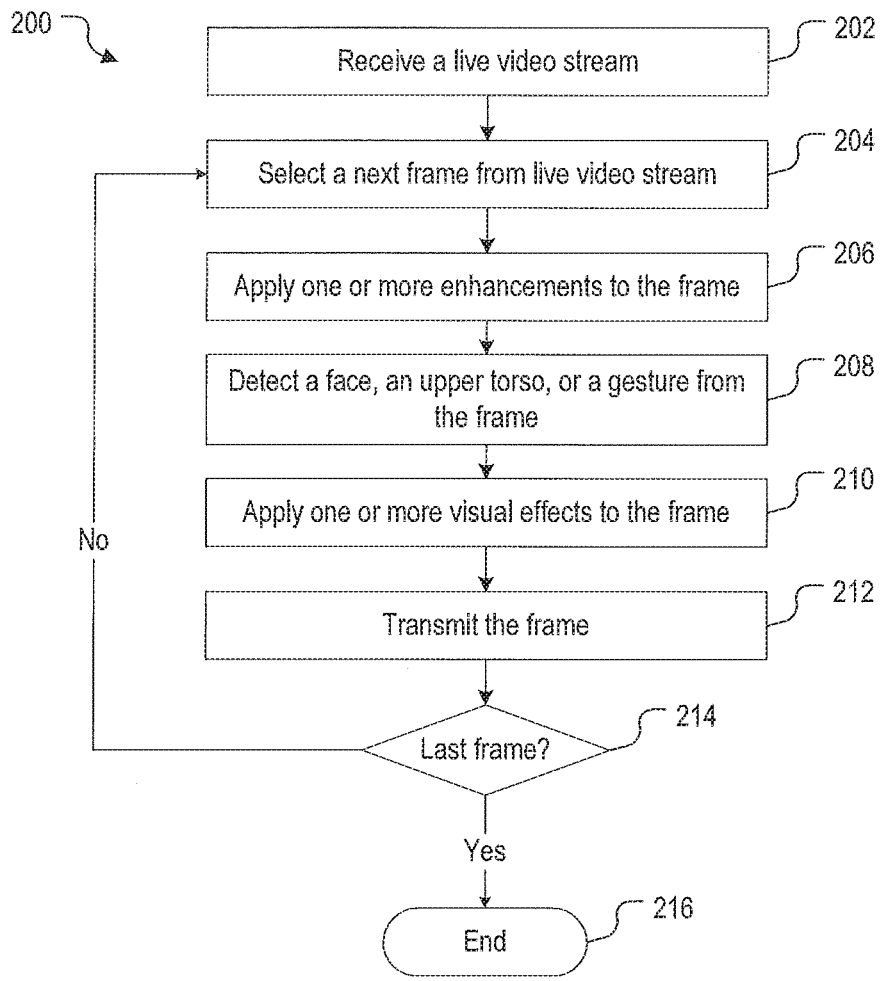
FIG. 2 is a flowchart of a method for the computing device of FIG. 1 to provide a video chat in one or more embodiments of the present disclosure.

FIG. 2 is a flowchart of a method 200 for computing device 102 (FIG. 1) to provide a video chat in one or more embodiments of the present disclosure. Method 200 may be implemented by processor 108 (FIG. 1) executing video chat plug-in 124 (FIG. 1) or video chat application 122 (FIG. 1) having the features of video chat plug-in 124. Method 200 and any method described herein may include one or more operations, functions, or actions illustrated by one or more blocks. Although the blocks are illustrated in sequential orders, these blocks may also be performed in parallel, or in a different order than those described herein. Also, the various blocks may be combined into fewer blocks, divided into additional blocks, or eliminated based upon the desired implementation. Method 200 may begin in block 202.

In block 202, processor 108 receives a live video stream captured by camera 114 (FIG. 1). Block 202 may be followed by block 204.

In block 204, processor 108 starts to process the frames in the live video stream by selecting a next frame from the live video stream. Block 204 may be followed by block 206.

In block 206, processor 108 applies one or more enhancements to the frame. Block 206 may be followed by block 208.

In block 208, processor 108 detects a face, an upper torso, and a gesture, if any, from the frame. Processor 108 may execute analyzers that have been trained with positive and negative samples based on various features to detect face, upper torso, and gestures. Block 208 may be followed by block 210.

In block 210, processor 108 applies one or more visual effects to the frame based on the detected face, upper torso, and gesture, if any. Block 210 may be followed by block 212.

In block 212, processor 108 transmits the frame to computing device 104 (FIG. 1). Block 212 may be followed by block 214.

In block 214, processor 108 determines if the frame is the last frame in the live video stream. If so, block 214 may be followed by block 216, which ends method 200. Otherwise block 214 may loop back to block 204 to process the next frame in the live video stream.

Figure 3:
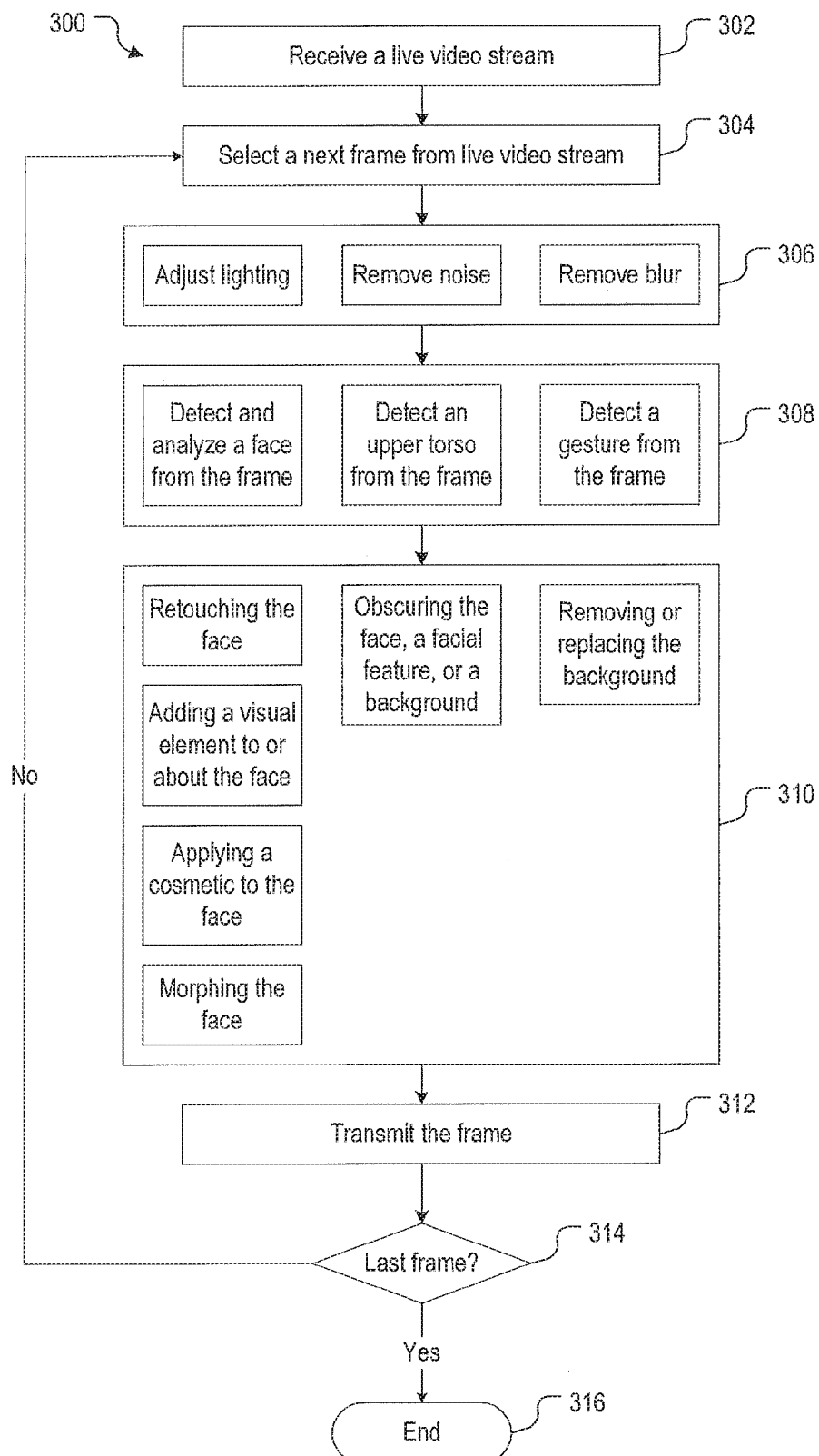
FIG. 3 is a flowchart of another method for the computing device of FIG. 1 to provide a video chat in one or more embodiments of the present disclosure.

FIG. 3 is a flowchart of a method 300 for computing system 102 (FIG. 1) to provide a video chat in one or more embodiments of the present disclosure. Method 300 may be implemented by processor 108 (FIG. 1) executing video chat plug-in 124 (FIG. 1) or video chat application 122 (FIG. 1) having the features of video chat plug-in 124. Method 300 may be a variation of method 200 (FIG. 2). Method 300 may begin in block 302.

In block 302, processor 108 receives a live video stream captured by camera 114 (FIG. 1). Block 302 may be followed by block 304. Block 302 is similar to block 202 (FIG. 2) of method 200.

In block 304, processor 108 starts to process the frames in the live video stream by selecting a next frame from the live video stream. Block 304 may be followed by block 306. Block 304 is similar to block 204 (FIG. 2) of method 200.

In block 306, processor 108 applies one or more enhancements to the frame. Processor 108 may adjust the lighting in the frame, such as correcting overexposure, underexposure, or uneven lighting (e.g., dim, side, top, or bottom lighting). Processor 108 may also remove noise and blurring from the frame.

In one example, processor 108 enhances all the frames in the live video stream. In another example, processor 108 starts to enhance the frames in the live video stream when it detects poor exposure, poor lighting, noise, or blurring in the live video stream. Processor 108 may determine if the live video stream has poor exposure, poor lighting, noise, or blurring in each frame or every few frames. In another example, a user selects one or more enhancements during the video chat or an initial setup of video chatting plug-in 124 prior to the video chat.

Block 306 may be followed by block 308. Block 306 is similar to block 206 (FIG. 2) of method 200.

In block 308, processor 108 detects a face, outlines of facial features, and points of the facial features. The facial features include cheeks, mouth, eyes, eye brows, nose, irises, pupils, teeth, lips, and T-zone (e.g., an area including the nose and across the forehead). User 126 may manually fine-tune the locations of the facial feature points during an initial setup of video chatting plug-in 124 prior to the video chat. Processor 108 may also detect facial hair, glasses, and hair style, and estimate age, gender, and race. Processor 108 may not estimate age, gender, and race in each frame. For example, processor 108 may recognize the same face from frame to frame so it does not need to estimate age, gender, and race again.

Processor 108 detects an upper torso (e.g., neck and shoulders) from the frame. As the detected face and upper torso form the foreground of the frame, processor 108 designates the remaining area in the frame as the background of the frame.

Processor 108 detects gestures. The gestures include facial gestures (e.g., emotional expressions), hand gestures, and movements of other body parts. Processor 108 may use preceding frames to detect gestures in the current frame.

Processor 108 may execute analyzers that have been trained with positive and negative samples based on various features to detect face, facial features, facial hair, glasses, hair style, age, gender, race, upper torso, and gestures. Once the face, facial feature outlines, facial feature points, facial hair, glasses, hair style, upper torso, and gestures have been detected in a prior frame, their locations in the prior frame may be used as the starting point to search for the new locations in the subsequent frame. Furthermore, locations of the face, facial features, facial hair, glasses, upper torso, and gestures may be correlated to assist in their detection.

Block 308 may be followed by block 310. Block 308 is similar to block 208 (FIG. 2) of method 200.

In block 310, processor 108 applies one or more visual effects to the frame. Processor 108 may retouch the face, apply cosmetics to the face, add static or dynamic visual elements to or about the face, or morph the face.

Figure 4:
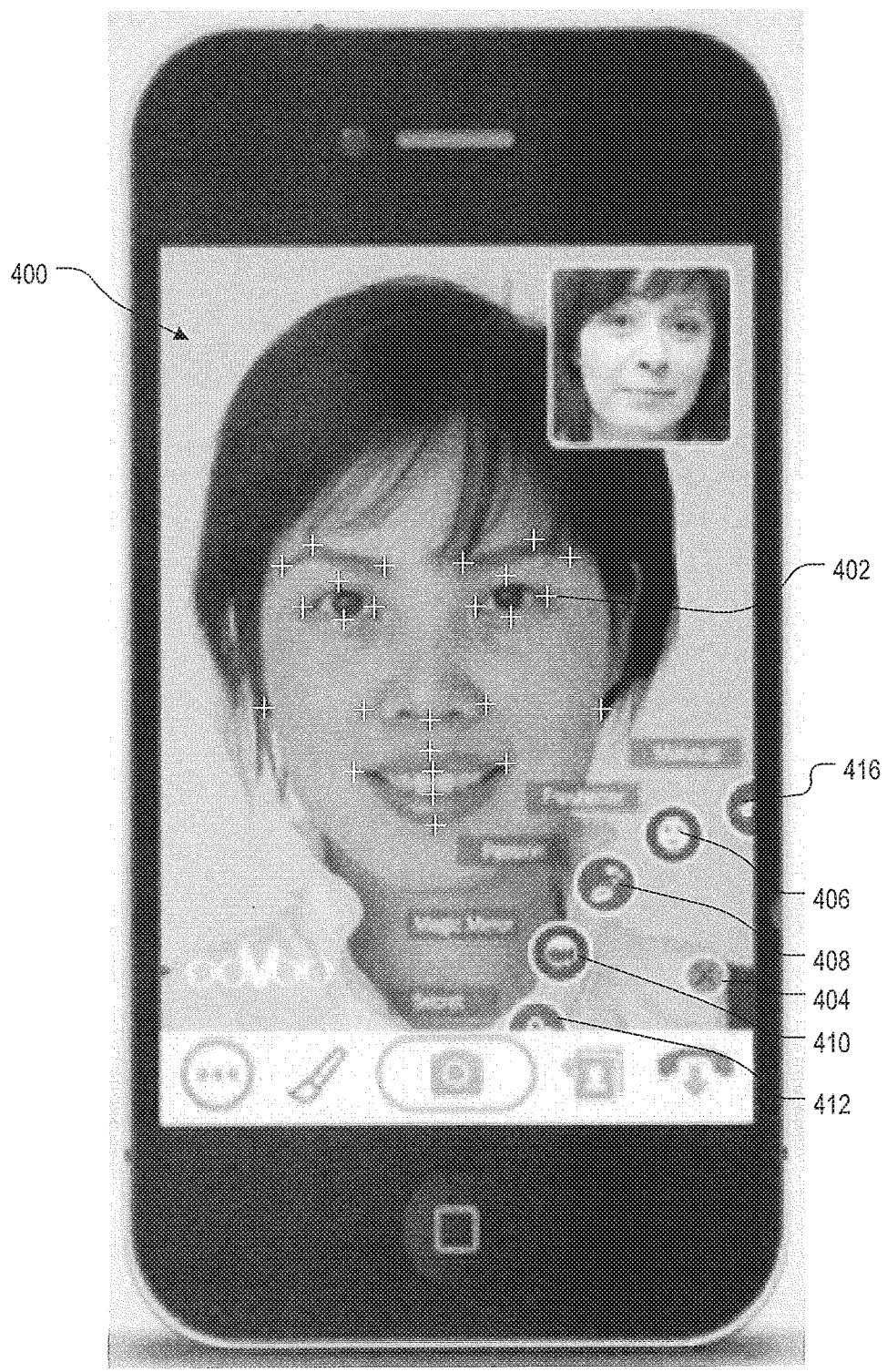
FIGS. 4 to 11 are screenshots of a graphic user interface of a video chatting application in FIG. 1 in examples of the present disclosure.

FIG. 4 shows a screen 400 of a graphic user interface (GUI) for video chatting application 122 in examples of the application. Illustrated in phantom are various facial feature points 402 (only two are labeled). Prior to or during the video chat, a menu 404 is selected to bring up a scrollable list of features and to make the local live video stream larger than the remote live video stream so the visual effects may be better seen. The features include freshener 406, passion 408, funhouse mirror 410, secret 412, stickers 414 (off screen), and makeup 416. Menu 404 is deselected to hide list 405 and to make the remote live video stream larger than the local live video stream.

Figure 5:
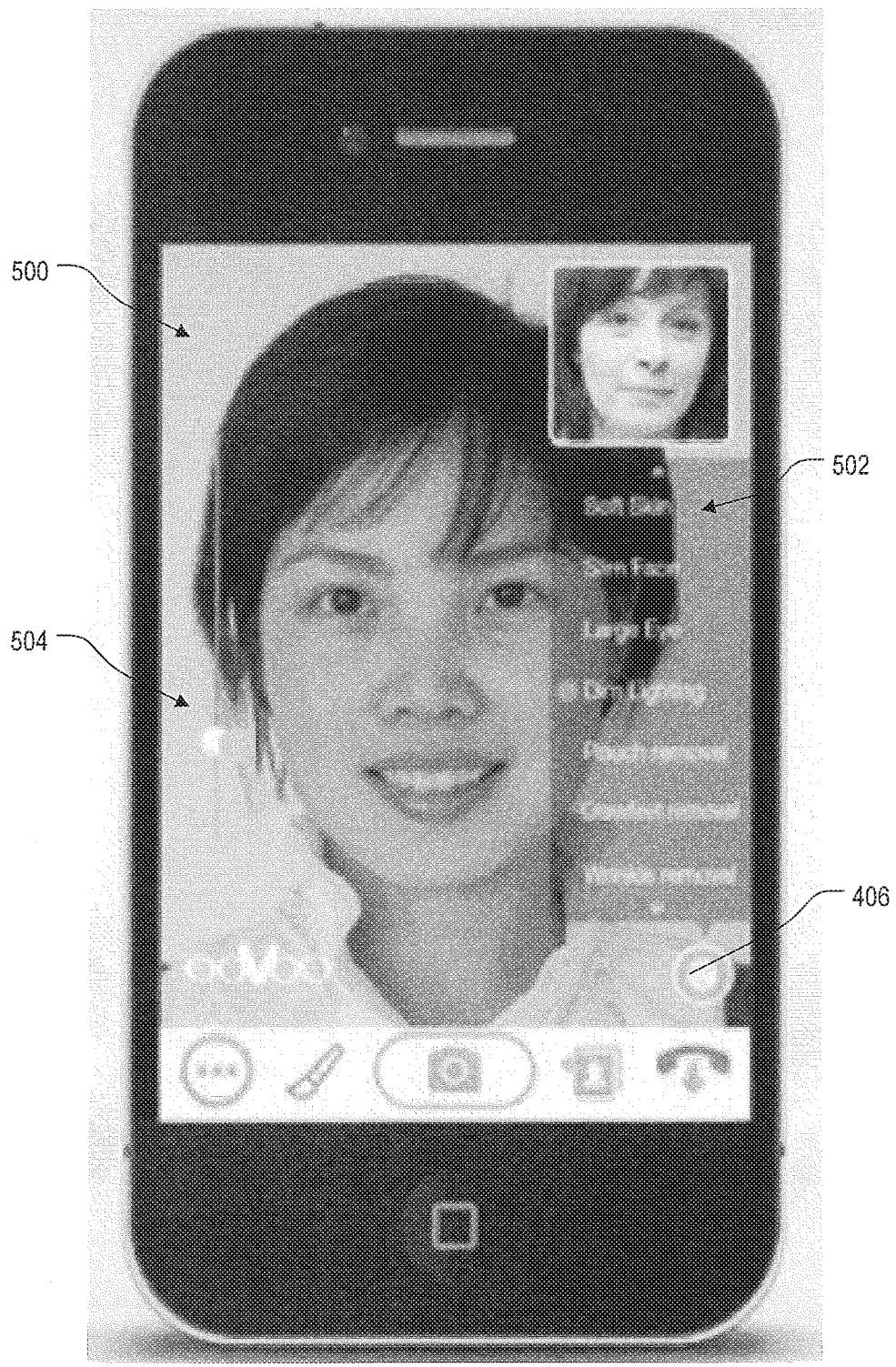

When freshener icon 406 on screen 400 is selected, processor 108 generates a screen 500 shown in FIG. 5 in examples of the present disclosure. Screen 500 includes a scrollable list 502 of retouch functions. The retouch functions include soft skin, slim face, large eyes, dim lighting, under-eye bags removal, crowfeet removal, wrinkle removal, healthy skin, whiten teeth, cheek lift, brighten eyes, sexy nose, eye corner lift, and double chin removal. These retouch functions may be adjusted based on the estimated age, gender, and race of the detected face. When a retouch function is selected, a slider 504 may appear to allow adjustment of the retouch function. Freshener icon 406 on screen 500 is selected to hide list 502 and slider 504 and return to screen 400.

Figure 6:
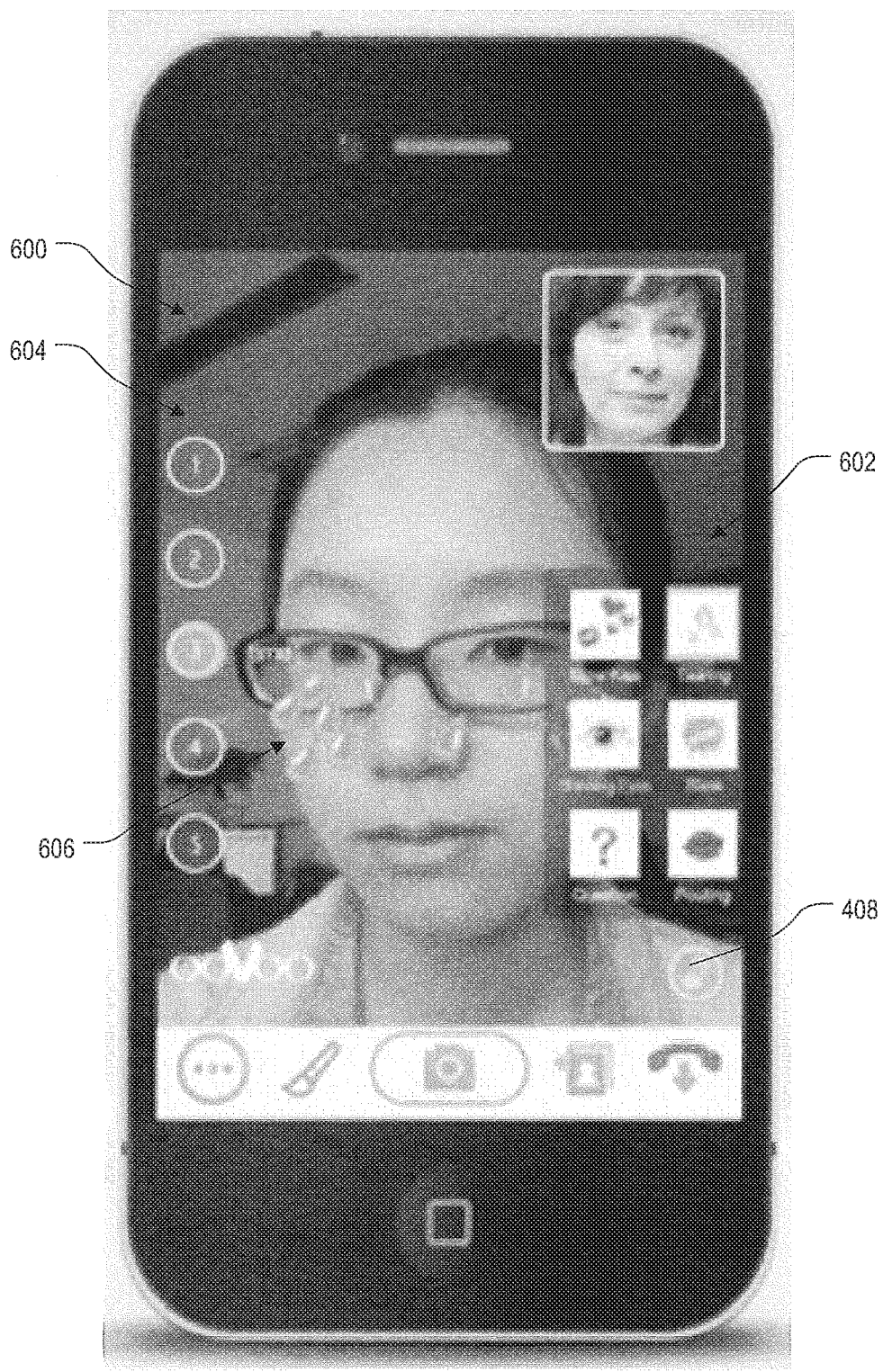

When passion icon 408 on screen 400 is selected, processor 108 generates a screen 600 shown in FIG. 6 in examples of the present disclosure. Screen 600 includes a (scrollable) list 602 of dynamic visual elements (e.g., animations). An animation may include a series of graphics placed on the frames to create the appearance of movement. Processor 108 tracks the graphic placed on the current frame so processor 108 would place the next graphic in the series in the subsequent frame. An animation may be anchored to a facial feature to follow that facial feature in the live video stream. An animation may be triggered by a gesture. When an animation is selected, options 604 may appear to allow adjustment of the animation. Passion icon 408 on screen 600 is selected to hide list 602 and options 604 and return to screen 400.

The animations include blowing kisses, tearing, sparkling eyes, WOW, questions, and puckering lips. The tearing animation is anchored to the eyes and appears as giant tears 606 streaming from the eyes. The blowing kisses animation is anchored to the mouth and appears as a stream of kisses flying away from the mouth. The blowing kisses animation may be continuous or triggered by the gesture of blowing a kiss. The sparkling eyes animation is anchored to the eyes and appears as sparkles emanating from the eyes. The WOW animation is anchored to a corner of the mouth and appears as a callout cloud with the word WOW. The WOW animation may be continuous or triggered by the gesture of mouthing the word WOW. The questions animation is anchored above the head and appears as large question marks. The question animation may be continuous or triggered by the gesture of a confused facial expression. The puckering lips animation is anchored to the mouth and appears as a stream of puckered lips flying away from the mouth. The puckering lips animation may be continuous or triggered by the gesture of puckered lips.

Figure 7:
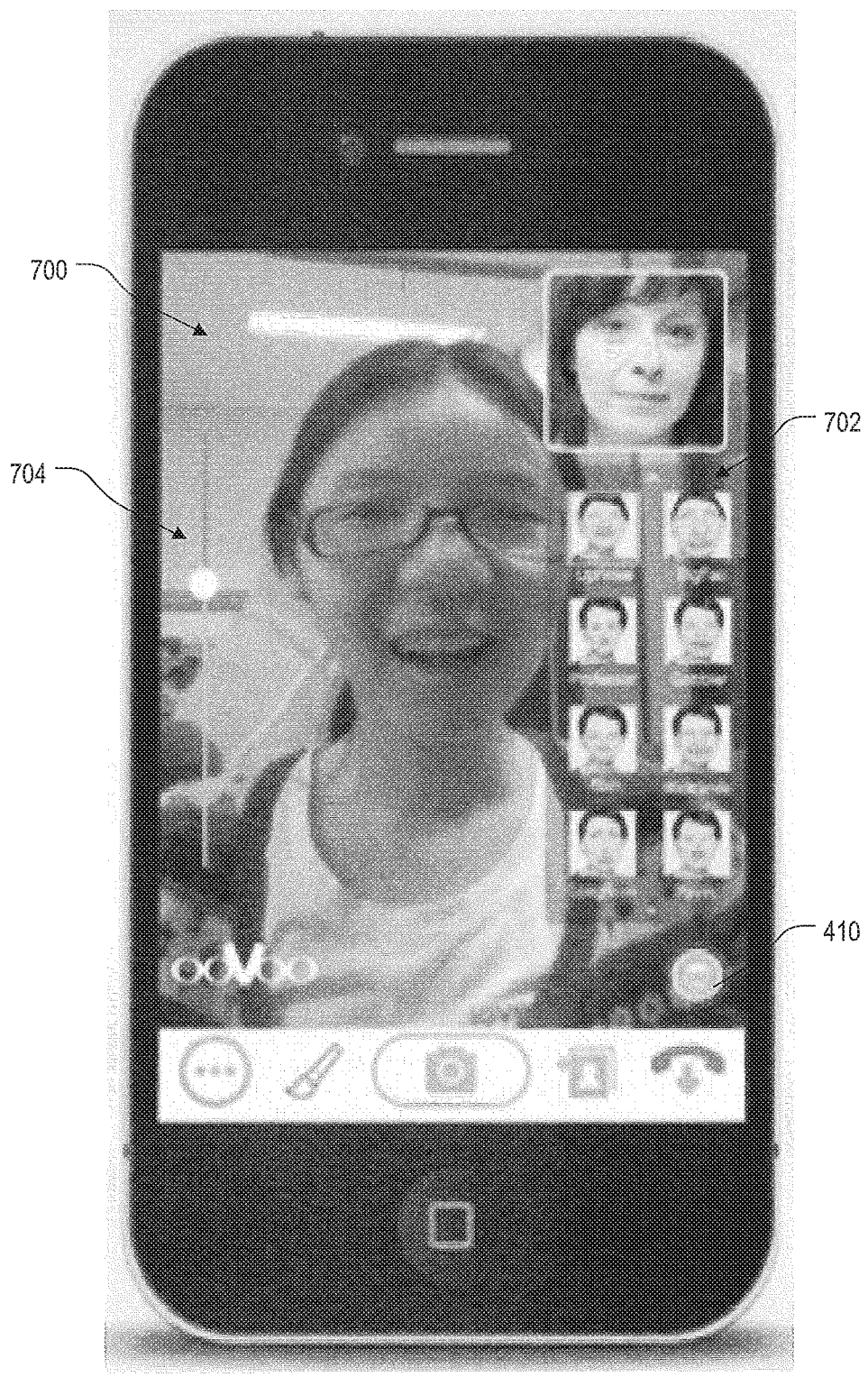

When funhouse mirror icon 410 on screen 400 is selected, processor 108 generates a screen 700 shown in FIG. 7 in examples of the present disclosure. Screen 700 includes a (scrollable) list 702 of funhouse mirror effects. When a funhouse mirror effect is selected, a slider 704 may appear to allow adjustment of the funhouse mirror effect. Funhouse mirror icon 410 on screen 700 is selected to hide list 702 and slider 704 and return to screen 400.

Figure 8:
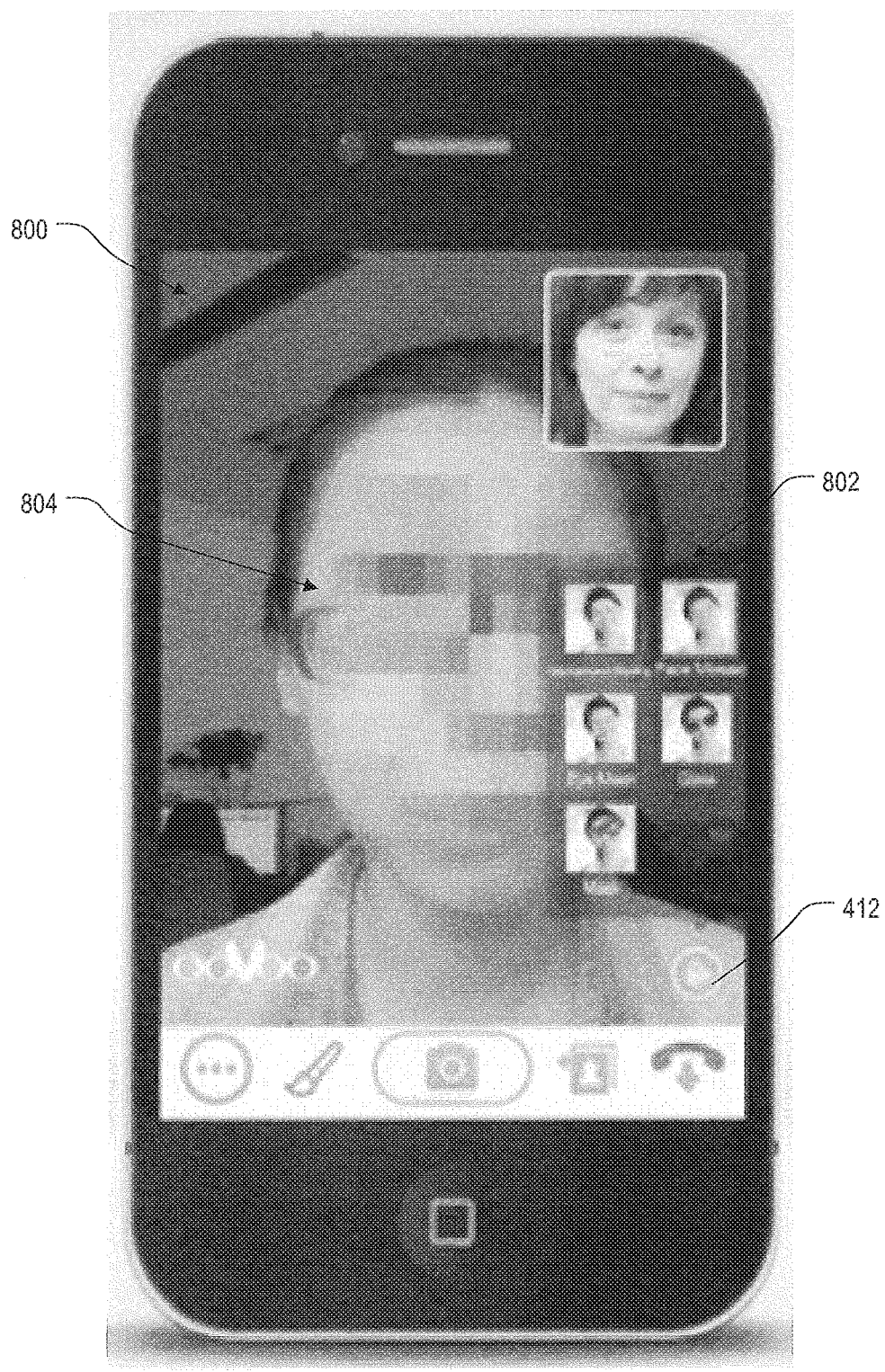
Figure 9:
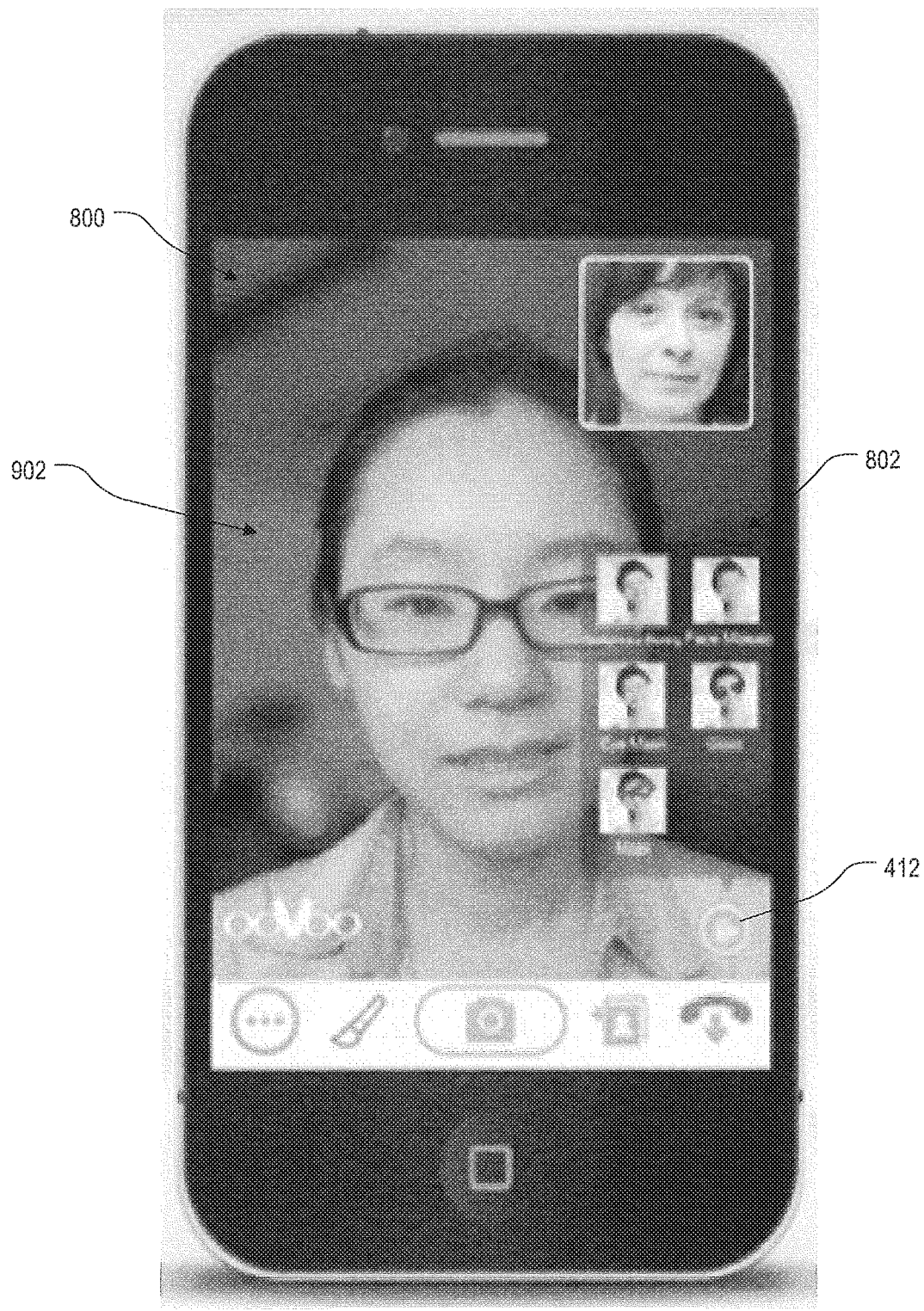

When secret icon 412 on screen 400 is selected, processor 108 generates a screen 800 shown in FIG. 8 in examples of the present disclosure. Screen 800 includes a (scrollable) list 802 of privacy effects. The privacy effects include face mosaic, background blurring, background removal, background replacement, eye mask, sunglasses, and face mask. For example, FIG. 8 shows a face mosaic and FIG. 9 shows background blurring in examples of the present disclosure. Secret icon 412 on screen 800 is selected to hide list 802.

Figure 10:

When sticker icon 414 on screen 400 is selected, processor 108 generates a screen 1000 shown in FIG. 10 in examples of the present disclosure. Screen 1000 includes a (scrollable) list 1002 of static visual elements (e.g., stickers). The stickers include a necklace, earrings, and heart. A sticker may be anchored to a facial feature to follow that facial feature in the live video stream, such as earrings may be anchored to the ears. When a sticker is selected, options 1004 may appear to allow adjustment of the sticker. Sticker icon 414 on screen 1000 is selected to hide list 1002 and options 1004 and return to screen 400.

Figure 11:
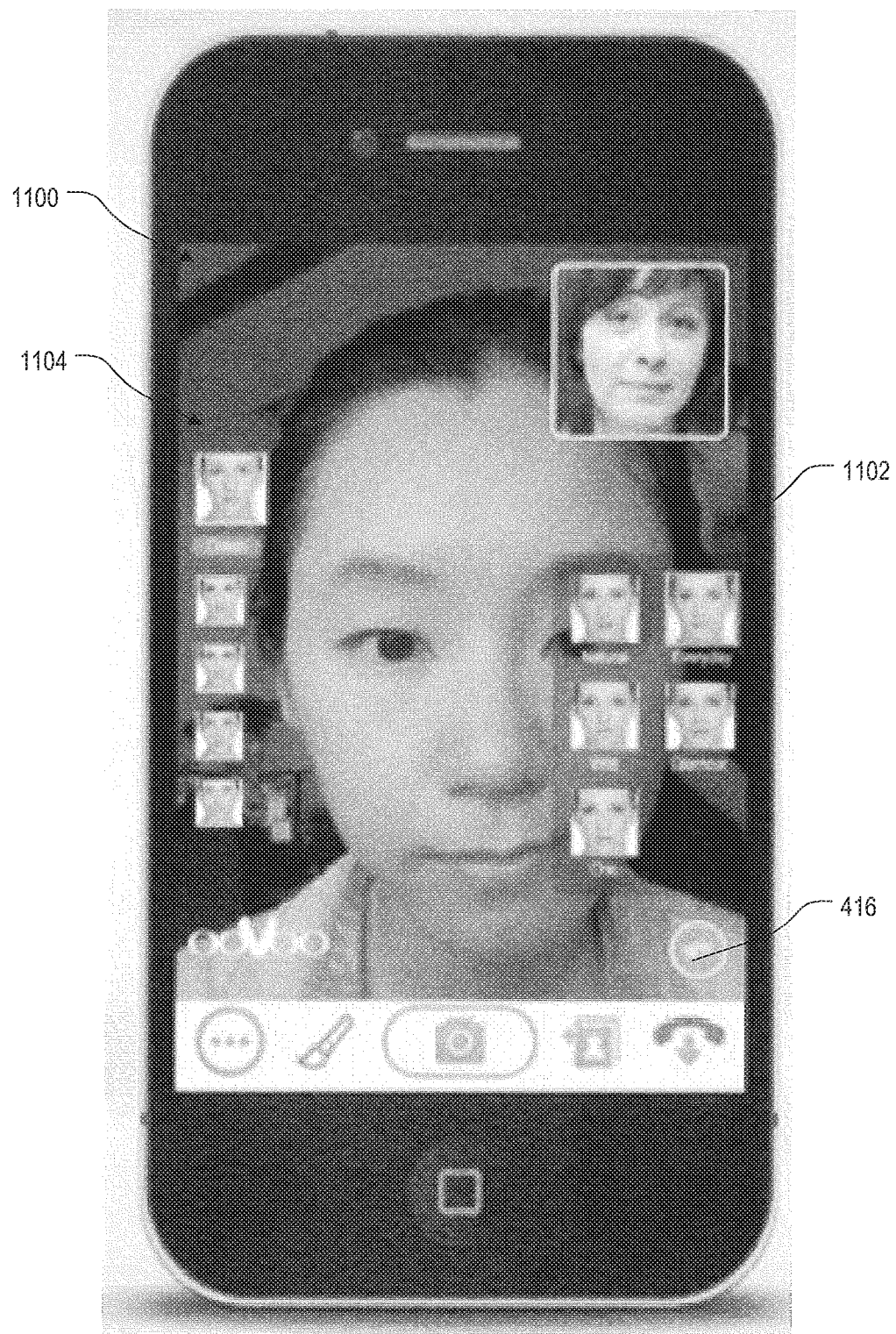

When makeup icon 416 is selected, processor 108 generates a screen 1100 shown in FIG. 11 in examples of the present disclosure. Screen 1100 includes a (scrollable) list 1102 of cosmetics. The cosmetics include eyeliner, eye shadow, blush, lipstick, and foundation. These cosmetics may be adjusted based on the estimated age, gender, and race of the detected face. When a cosmetic is selected, options 1104 may appear to allow adjustment of the cosmetic. Makeup icon 416 on screen 1100 is selected to hide list 1102 and options 1104 and return to screen 400.

Referring to back to FIG. 3, block 310 may be followed by block 312. Block 310 is similar to block 210 (FIG. 2) of method 200.

In block 312, processor 108 transmits the frame to computing device 104 (FIG. 1). Block 312 may be followed by block 314. Block 312 is similar to block 212 (FIG. 2) of method 200.

In block 314, processor 108 determines if the frame is the last frame in the live video stream. If so, block 314 may be followed by block 316, which ends method 300. Otherwise block 314 may loop back to block 304 to process the next frame in the live video stream. Block 314 is similar to block 214 (FIG. 2) of method 200.

Various other adaptations and combinations of features of the embodiments disclosed are within the scope of the present disclosure. Numerous embodiments are encompassed by the following claims.

What is claimed is:

1. A method for a computing device to enhance video chatting, comprising:
   receiving a live video stream;
   detecting a gesture in the live video stream in real-time; and
   generating an animated effect in response to the gesture, comprising:
      processing a frame in the live video stream in real-time, comprising:
         detecting a face in the frame;
         placing a graphic to or about the face in the frame;
      transmitting the frame to an other computing device;
      processing additional frames that consecutively follow the frame in the live video stream in real-time by repeating said detecting and said placing to place other graphics to or about the face in the additional frames, the graphic and the other graphics creating an appearance of movement; and
      transmitting the additional frames to the other computing device.

2. The method of claim 1, wherein the gesture comprises a facial gesture, a hand gesture, or a movement of another body part.

3. The method of claim 1, further comprising adjusting lighting in the frame and the additional frames, removing noise from the frame and the additional frames, or removing blur from the frame and the additional frames.

4. The method of claim 1, further comprising detecting facial features from the face in the frame, wherein said placing the graphic to or about the face is based on a location of a facial feature.

5. The method of claim 1, further comprising processing more frames in the live video stream in real-time by detecting the face in the more frames and applying another visual effect to the more frames, wherein said applying another visual effect to the more frames comprises retouching the face.

6. The method of claim 1, further comprising processing more frames in the live video stream in real-time by detecting the face in the more frames and applying a cosmetic to the face in the more frames.

7. The method of claim 1, further comprising processing more frames in the live video stream in real-time by detecting the face in the more frames and morphing the face in the more frames.

8. The method of claim 1, further comprising processing more frames in the live video stream in real-time by obscuring or replacing a background in the more frames.

9. A non-transitory computer-readable medium comprising instructions for a processor to enhance video chatting, the instructions comprising:
   receiving a live video stream;
   detecting a gesture in the live video stream in real-time; and
   generating an animated effect in response to the gesture, comprising:
      processing a frame in the live video stream in real-time, comprising:
         detecting a face in the frame;
         placing a graphic to or about the face in the frame;
      transmitting the frame to an other computing device;
      processing additional frames that consecutively follow the frame in the live video stream in real-time by repeating said detecting and said placing to place other graphics to or about the face in the additional frames, the graphic and the other graphics creating an appearance of movement; and
      transmitting the additional frames to the other computing device.

10. The non-transitory computer-readable medium of claim 9, wherein the gesture comprises a facial gesture, a hand gesture, or a movement of another body part.

11. The non-transitory computer-readable medium of claim 9, wherein the instructions further comprise adjusting lighting in the frame and the additional frames, removing noise from the frame and the additional frames, or removing blur from the frame and the additional frames.

12. The non-transitory computer-readable medium of claim 9, wherein the instructions further comprise detecting facial features from the face in the frame, wherein said placing the graphic to or about the face is based on a location of a facial feature.

13. The non-transitory computer-readable medium of claim 9, wherein the instructions further comprise processing more frames in the live video stream in real-time by detecting the face in the more frames and applying another visual effect to the more frames, wherein said applying another visual effect to the more frames comprises retouching the face.

14. The non-transitory computer-readable medium of claim 9, wherein the instructions further comprise processing more frames in the live video stream in real-time by detecting the face in the more frames and applying a cosmetic to the face in the more frames.

15. The non-transitory computer-readable medium of claim 9, wherein the instructions further comprise processing more frames in the live video stream in real-time by detecting the face in the more frames and morphing the face in the more frames.

16. The non-transitory computer-readable medium of claim 9, wherein the instructions further comprise processing more frames in the live video stream in real-time by obscuring or replacing a background in the more frames.

* * * * *